United States Patent

[11] 3,601,447

| | | |
|---|---|---|
| [72] | Inventor | Robert E. Kelley<br>159 32nd St., Cedar Rapids, Iowa 52105 |
| [21] | Appl. No. | 829,670 |
| [22] | Filed | June 2, 1969 |
| [45] | Patented | Aug. 24, 1971 |

[54] DUMP TRUCK-TRAILER COMBINATION
10 Claims, 7 Drawing Figs.

[52] U.S. Cl. .................................................. 298/14,
298/22
[51] Int. Cl. ................................................. B60p 1/18
B60p 1/30
[50] Field of Search ........................................... 298/8, 8 T,
1, 14, 11; 114/502, 505

[56] References Cited
UNITED STATES PATENTS

| 2,770,490 | 11/1956 | Hockensmith, Jr. .......... | 298/8 |
| 3,193,330 | 7/1965 | Hribar, Jr. ..................... | 298/8 |
| 3,361,477 | 1/1968 | Pitts ............................. | 298/14 |

*Primary Examiner*—Milton Buchler
*Assistant Examiner*—Carl A. Rutledge
*Attorneys*—Haven E. Simmons and James C. Nemmers

ABSTRACT: A truck-trailer combination for hauling and dumping bulk materials. The rig includes a trailer and a towing vehicle and has two tiltable dump bodies which are separate while the rig is moving over the road, but when the contents are to be unloaded, the one dump body is joined to the other and the two dump bodies are tilted together and unloaded as a single unit.

PATENTED AUG 24 1971

INVENTOR.
ROBERT E. KELLEY
BY James C. Nemmers
ATTORNEY

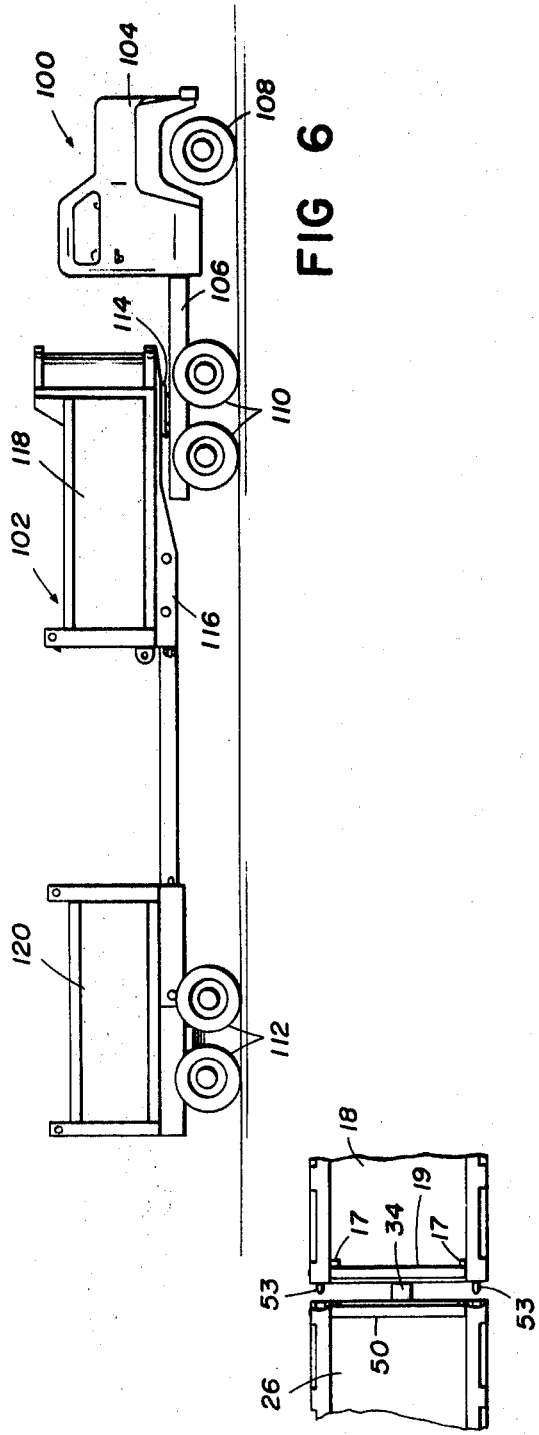

DUMP TRUCK-TRAILER COMBINATION

BACKGROUND OF THE INVENTION

Many states have laws which regulate the size and weight of the vehicles traveling over highways and using the bridges within its particular jurisdiction. The regulations vary from state to state, but basically they limit the amount of weight per axle, and also limit the total weight according to a formula in which the maximum permissible weight increases as the distance between the axles of the vehicle increases. These axle spacing requirements and axle loading limitations are sometimes commonly referred to as "bridge formulas. " These limitations become a problem especially with vehicles that are designed to carry bulk material which has a high weight per unit volume. Such bulk-hauling vehicles usually unload the material being carried by tilting one end of a dump body. If a single dump body is made long enough to carry the maximum permissible load allowed by many states, the body would have to be well over 30 feet in length. A dump body of such a length becomes not only impractical but dangerous because the vehicle becomes extremely top-heavy and can be easily upset when the dump body is raised. Moreover, single dump trailers must be built strong enough to carry the loads imposed upon them particularly when the bodies are raised and the contents dumped. This heavier construction increases the tare weight reducing the payload that can be hauled and making it less economical to haul bulk materials.

There have been many attempts to overcome these problems by designing single dump bodies with movable tandem axles so the distance between the load-carrying axles can be increased while the vehicle is traveling over the road and decreased during dumping. There have been other attempts in which a tandem-pup trailer is pulled over the road and then separately dumped. The former solution has definite limitations, while the latter solution makes the dumping process difficult and time consuming even though many ingenious ways have been devised for dumping first one of the dump bodies and then the other. MOreover, the additional cost involved in some of the rather complex truck-trailer combinations makes the economics of these arrangements rather unattractive to the trucker.

SUMMARY OF THE INVENTION

Applicant's invention provides a combination rig which, in one embodiment, a tri-axle or tandem dump truck has attached thereto a tandem-axle trailer. When the rig is moving over the road, the trailer is towed by the dump truck using a telescopic trailer tongue that spaces the trailer a sufficient distance from the dump truck to comply with the weight laws. When the material is to be unloaded, the two dump bodies are locked together and dumped as a unit. Because of the now closely spaced axles and relatively short dump body, the unit is sufficiently stable to avoid the possibility of upset. Material can be not only unloaded into stockpiles, bins or other storage areas but also can be spread in a manner similar to the standard dump truck. Also, the dump truck can be used separately when load and conditions require it. DESCRIPTION OF THE DRAWINGS FIG. 1 is a side elevational view of a dump truck with attached trailer showing the trailer in the over-the-road towing position;

FIG. 5 is a top view of portions of the dump bodies to be joined;

FIG. 6 is a side elevational view of another embodiment of the invention in which the principles of the invention are applied to a semitrailer; and FIG. 7 is a side elevational view of the embodiment of FIG. 6 but showing the dump bodies joined and being raised as a unit.

Figure 1:
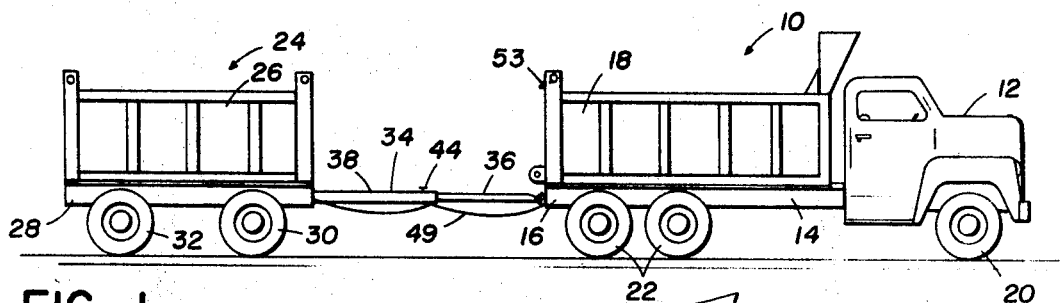
Figure 2:
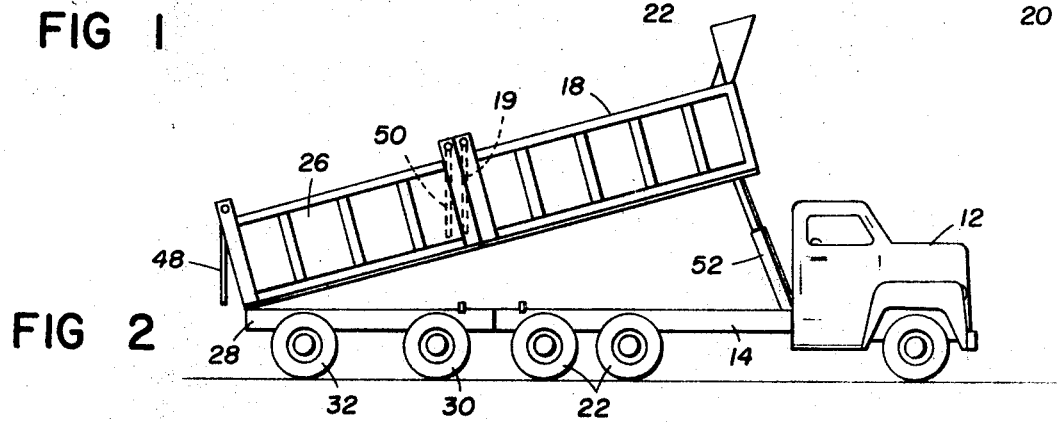
FIG. 2 is a side elevational view of the trailer-truck combination of FIG. 1, but showing the trailer joined to the dump truck and further showing the dump bodies being raised as a unit.

The objects and features of the invention will become readily apparent from a consideration of these drawing taken in connection with the following description. DESCRIPTION OF THE PREFERRED EMBODIMENTS OF THE INVENTION Referring to FIG. 1 and FIG. 2 of the drawings, there is shown a dump truck 10 which is substantially similar to the well-known dump truck. The dump truck consists of a cab 12 supported on a chassis 14 (partially shown) the rear portion 16 of which consists of parallel beams that form the bed for the dump body 18.

As is common practice, the dump truck 10 has front wheels 20 and tandem rear wheels 22. Dump trucks of this type are commonly used, but the dump truck which forms a part of the invention is modified slightly from the usual dump truck as will be described more fully hereinafter. A tailgate 19 is pivotally mounted at the rear inside of the dump body 18 so that the lower end of the tailgate 19 can freely swing outwardly when unlatched. Unlike the tailgate of a standard dump truck, the bottom and side on of the tailgate 19 terminate at distances that would allow the tailgate to swing inside of the dump body 18 except for stops 17 (FIG. 3) at each side of the dump body. This is necessary to allow the tailgate 19 to clear the dump body of the trailer 24 when the two are joined.

Trailer 24 is towed by the dump truck 10 and also has a dumpbody 26 mounted on a chassis 28 which may consist of parallel beams. The dump body 26 is affixed to the chassis 28 in any well-known manner which will allow the front of the body to be raised as the body pivots about its lower rear edge. The front of the dump body 26 need not be secured to the chassis 28 since its weight, particularly when loaded, will hold it in engagement with the chassis. The trailer 24 is supported by front wheels 30 and rear wheels 32 or it may be supported tandem wheels. The trailer 24 is connected to the dump truck 10 by a telescopic trailer tongue 34 which preferably consists of three sections, a front section 36, an intermediate section 38, and a rear section 40 (FIG. 4) which forms a part of the chassis 28 for the trailer 24. The front section 36 of the telescopic tongue 34 is releaseably connected to the chassis 14 of the dump truck 10 by a suitable hitch such as a pintle hook 42. When extended, the telescopic sections are locked in an extended position by means of pins 44 and 46, pin 44 locking the front section 36 to the intermediate section 38 while pin 46 locks together the intermediate section 38 and the rear section 40. With the telescopic tongue 34 in its fully extended position, the trailer 24 will be towed a substantial distance to the rear of the dump truck 10.

The distance will be such as to assure compliance with weight laws in those states which have restrictive bridge formulas. This arrangement allows a maximum payload to be carried in the most economical manner using only a single prime mover and a single driver. Obviously, this arrangement could be used using any standard dump truck and a trailer.

The problems arise, however, in unloading the bulk material from the dump truck and trailer, particularly the latter. Each could, of course, be provided with the usual hydraulic lift and dumped separately. However, this is not easily done where the material is to be dumped into a single bin or stock pile. Also, where it is desired to spread the material, problems are presented. The invention overcomes these problems in a very simple manner with an arrangement that is quickly and easily used.

Figure 4:
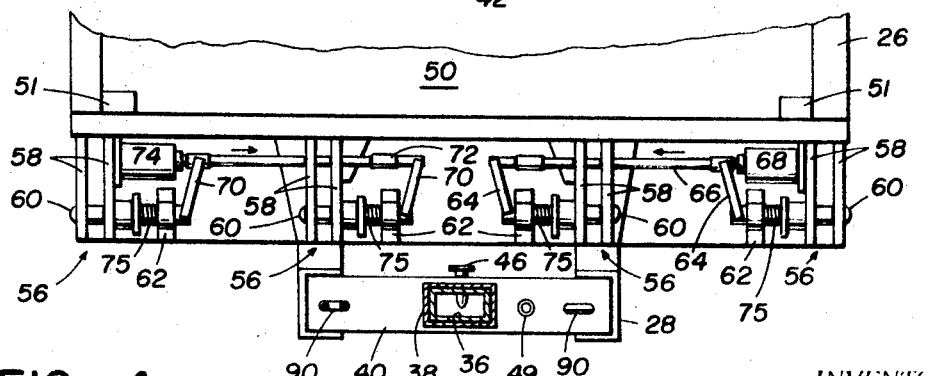
FIG. 4 is an enlarged view of a portion of the front of the trailer and illustrating the mechanism for locking the two dump bodies together.

The trailer 24 is provided with the usual type of tailgate 48 at its rear, the tailgate being pivotally mounted at its upper end to the dump body 26 and secured by releasable latch means (not shown) at its lower end so that it can be held closed except when dumping. THe trailer 24 is also provided with a tailgate 50 at its front end, which tailgate 50 is pivoted at its upper end to the dump body 26 so that its lower end will swing only from front to rear inwardly if the front of the dump body 26 is raised. To prevent the tailgate 50 from swinging outwardly, the dump body 26 is provided with stops 51 (FIG. 4.). The load being carried will hold the tailgate 50 in a closed position against stops 51 except when dumping.

The trailer 24 must be provided with brakes, preferably air operated, that are controlled from the cab 12 of the dump truck 10. The particular design or type of brakes does not form a pat of the invention, but if the brakes are air operated, air hoses 49 (FIG. 1) lead from an air reservoir (not shown) to the trailer brakes. When the material being hauled is to be unloaded, the brakes are set on the trailer 24 and with the locking pins 44 and 46 removed, the dump truck 10 is backed until the rear of the dump body 18 engages the front of the dump body 26 of the trailer 24. Proper engagement of the two dump bodies is assured by tapered alignment pins 53 (FIG. 5) extending outwardly from the rear of the dump body 18 at its upper end. One such pin 53 on each side is sufficient. The pins 53 engage corresponding holes in the upper portion of the dump body 26 of the trailer 24. Proper engagement of the two dump bodies is also assisted by the telescopic tongue 34 which serves as a single guide while the truck 10 is backed toward the trailer 24. When engaged, the dump body 18 is then locked to the dump body 26 (in a manner described more fully hereinafter), and the rear portion of the dump body 18 of the dump truck 10 is disconnected from the chassis 14 by retracing the pivot pins 82 (described fully hereinafter). With the two dump bodies joined, a telescopic hoist 52, of the usual hydraulic type, is extended to elevate the front of the joined dump bodies which now pivot about the lower rear edge of the dump body 26 of the trailer 24. With all three tailgates 19, 48 and 50 free to pivot at their upper ends, the material will flow downwardly and rearwardly and will be discharged through the rearmost tailgate 48. The joined dump bodies are elevated to a sufficient height, usually to an angle of about 52° from the horizontal, to allow all of the material to be discharged. It will be obvious that the material can be unloaded into a single area or stockpile or into a bin, or it can be spread by moving the rig forward as the joined dump bodies are elevated. When all of the material has been discharged from the dump bodies, the telescopic hoist 52 is retracted and the dump bodies lowered. When the dump bodies have been lowered to their respective chassis, the rear of the dump body 18 is locked onto the chassis 14 and the dump body 26 is disconnected from the dump body 18. With the brakes of the trailer 24 again set, the dump truck is driven slowly forward thus extending the telescopic tongue 34. When the telescopic tongue 34 is fully extended, the operator can reinsert the pins 44 and 46 to lock the telescopic tongue 34 in its fully extended position and latch the tailgates. The rig is then ready to be moved over the road.

Figure 3:
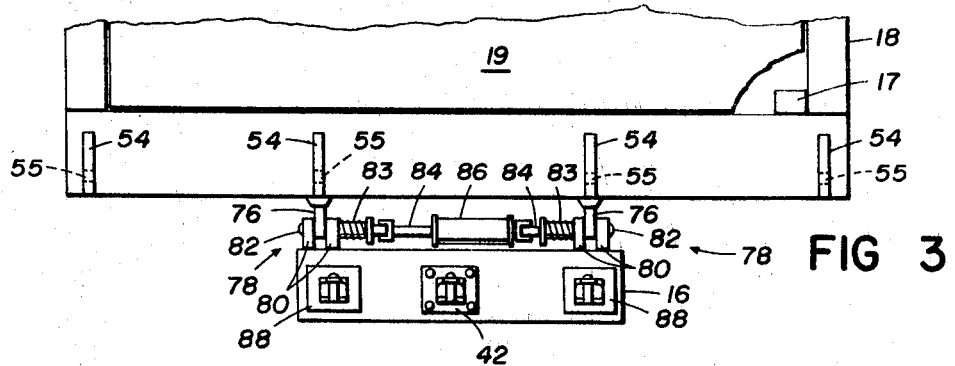
FIG. 3 is an enlarged view of a portion of the rear of the truck dump body and showing the mechanism for locking the dump body in place.

A preferred form of the various locking mechanisms for the dump bodies will now be described. Referring to FIG. 3, there is shown an enlarged view of a portion of the rear of dump body 18 of the dump truck 10. Extending from the rear of dump body 18 along the lower edge thereof are a plurality of ears 54. Each ear 54 is of a relatively narrow width and has a horizontal opening 55 extending through it. Extending downwardly from the bottom front edge of the dump body 26 of the trailer 24 are a plurality of couplings 56, as best seen in FIG. 4. Each of the couplings 56 includes a pair of rigid vertical members 58 which members are spaced apart a sufficient distance to receive one of the ears 54. The spacing of the pairs of vertical members 58 corresponding to the spacing of the ears 54. The vertical members 58 also have horizontally aligned and approximately corresponding in diameter and relative vertical position to the openings in the ears 54 so that the openings are aligned with the openings 55 when the ears 54 are received between vertical members 58. As previously mentioned, proper alignment is assured by pins 53 as well as the telescopic tongue 34. When the openings in ears 54 are aligned with openings 55 in the vertical members 58, the beds of the dump bodies 18 and 26 will be in substantially the same plane. In order to secure the dump bodies 18 and 26 together, the couplings 56 further include pins 60 each of which is movable within a limited distance along a horizontal line aligned with the openings in the vertical members 58. The pins 60 are slidable through guide and mounting members 62. As best seen in FIG. 4, the pins 60 for the two couplings 56 on the right of FIG. 4 are movable from left to right to lock the couplings, while the pins 60 for the two left couplings are movable from right to left in order to secure the couplings.

The pins 60 or the two right-hand couplings 56 have there outer ends pivotally connected to depending links 64 which are in turn connected to an opening rod 66 that is movable by an air cylinder 68. Similarly, the pins 60 for the two left-hand couplings 56 have their outer ends connected to links 70 which are in turn connected to an operating rod 72 that is movable by an air cylinder 74. The air cylinders 68 and 74 are of any standard type and are operated by suitable pneumatic controls (not shown) preferably located in the cab 12 of the truck 10.

Also, the cylinders 68 and 74 are preferably operated simultaneously by a single control. The pins 60 are each biased to a locking position by springs 75 and are normally in a locked position in the openings in members 58. The air cylinders 68 and 74 are operated to retract the pins temporarily while the ears 54 are moved into the couplings 56.

Thus, when the front end of the dump body 26 of trailer 24 is moved into abutting engagement with the rear end of the dump body 18 of the truck 10, and the ears 54 are moved into locking position within the pairs of vertical members 58, the pins 60, which were retracted by air cylinders 68 and 74, will be forced into the aligned openings by springs 75 to lock the couplings 56 and thereby secure the dump bodies 18 and 26 together. Other than alignment pins 53, there is no necessity for any further locking mechanism at the upper end of the dump bodies since their eight and the pins 53 will maintain them into tight engagement when the couplings 56 are locked and the joined dump bodies are raised by the hydraulic hoist 52.

The rear end of dump body 18, of course, must be secured to its chassis 16 except when dumping. Any suitable such locking means may be provided, and one such means is shown in FIG. 3. FIG. 3 illustrates the locking means for the rear of dump body 18 of the truck 10. A pair of spaced-apart depending ears 76 extend from the bottom of the dump body 18 near its rearmost edge. Secured to the chassis 16 are a pair of couplings each indicated generally by the reference numeral 78. Each of the couplings 78 includes a pair of vertical members 80 extending upwardly from chassis 16. THe vertical members 80 of each pair are spaced apart so as to receive one of the ears 78 between them since the spacing of the couplings 78 corresponds to the spacing of the ears 76. The ears 76 are vertical members 80 have openings extending horizontally therethrough which openings are in alignment when the dump body 18 is resisting on the chassis 16 with the ears 76 resting between the vertical members 80. Pins 82 normally extend through the aligned openings of the ears 76 and vertical members 80 when the couplings are locked, and if desired, resilient members such as springs 83 can be provided to bias the pins 82 into locked position.

Each of the pins 82 has its inner end p connected to an operating rod 84 which extends from each end of an air cylinder 86 that is free-floating within a limited distance. THe air cylinder 86 is operated by a pneumatic control system (not shown) preferably from within the cab 12 of the truck 10. When air pressure is applied to cylinder 86, the operating rod 84 will be moved from left to right (FIG. 3) until the left pin 82 is pulled. Since cylinder 86 is free-floating, the full stroke of the piston within cylinder 86 will cause the cylinder and rod to move from right to left to pull the right pin 82 after the left pin has been retracted. This arrangement thus eliminates the necessity of two cylinders.

With the coupling mechanisms described, it will be obvious that the dump bodies 18 and 26 can be locked to their respective chassis at all times except when it is desired to unload their contents. For additional stability during the unloading, it is also desirable to lock together the chassis 16 of the truck 10 and the chassis 28 of the trailer 24.

This is necessary if the rig is to be used for spreading the material as it is unloaded. THis locking of the two chassis is accomplished by providing two self-locking pintle hooks 88 at the rear of the truck chassis 16. THe eye portion 90 (FIG. 4) of each hook is secured to the chassis 28 of the trailer 24. As is well known, these will lock when engaged but must be manually released.

To summarize, when it is desired to unload the bulk material being carried, the brakes are set on the trailer 24, and with the pins 44 and 46 removed from tongue 34, the truck 10 is then backed toward the trailer until the rear of dump body 18 engages the front of the dump body 26. Telescopic tongue 34 and pins 53 will serve as a guide so that the ears 54 will be properly guided into the couplings 56. When the dump bodies 18 and 26 are thus moved into abutting engagement, the operator can actuate the control for air cylinders 68 and 74, first to retract and then lock pins 60 of the couplings 56. With dump bodies 18 and 26 thus locked together, and the chassis 16 locked to chassis 28 by pintle hooks 88, the operator can then actuate the control for air cylinder 86 to release the pins 82 from their respective couplings 78.

With latch means (not shown) then released from each of the tailgates 19 and 48, the operator can then actuate the hydraulic telescopic hoist 52 to raise the front end of the two dump body 18 carrying with it he dump body 26. The contents of the two dump bodies will be thus discharged. After unloading and before moving again over-the-road, the operator should reverse the unloading steps by first lowering the dump bodies, locking them into place on their respective chassis, and then releasing the couplings 56 and unlatching pintle hooks 88 so that the dump bodies can be separated. The latter is done by locking the brakes on the trailer 24 and driving the truck forward to extend the telescopic tongue 34. Telescopic tongue 34 is locked into its extended position by reinserting pins 44 and 46 and the rig is then ready for operation over the road.

If desired, it is obvious that the dump truck 10 can be used separately by retaining the couplings 78 in locked position, the pins 82 then serving as pivot pins for the dump body 18 as its front end is raised.

In FIGS. 6 and 7, there is illustrated a semitrailer dump truck which has an extendable frame or chassis in order to allow the rig to comply with the bridge formulas. The reasons for such an arrangement are the same as those for the arrangement shown in the first embodiment, i.e., to increase the load capacity of the rig in a manner that will assure compliance with the bridge formulas without affecting the capability of the rig to safely and quickly dump its load. In FIG. 6, there is shown a vehicle which consists basically of a prime mover 100 to which is connected a semitrailer 102. Prime mover 100 consists of a cab 104 mounted on a chassis 106 which in turn is supported on a front axle 108 and a tandem rear axle 110. The semitrailer 102 is supported at tandem axle 112 and is connected at the front to the prime mover 100 by the usual "fifth wheel" 114. The semitrailer chassis 116 supports a front dump body 118 and a rear dump body 120. The front dump body 118 is similar in construction to dump body 18 of the first embodiment, having a tailgate 122 at the rear. The rear dump body 120 is similar to dump body 26 and has a front tail gate 124 and a rear tail gate 126.

The chassis 116 is constructed in any suitable manner so that it can be extended to the position shown in FIG. 6 or retracted to join the dump bodies 118 and 120 as shown in FIG. 7 The two dump bodies 118 and 120 are joined and locked together in the same manner as the dump bodies 18 and 24 of the first embodiment and raised, when joined by a hydraulic hoist 128. The only major difference between the two embodiments is that the two dump bodies 118 and 120 are mounted on a single chassis 116 which itself is telescoping. Otherwise, the operation of the rig of FIGS. 6 and 7 is the same as that of the first embodiment. Of course, the rig of the first embodiment is designed to carry much greater loads than the rig of the first embodiment and can do so with all the advantages noted herein with respect to the first embodiment.

The invention thus provides an economical way of meeting the weight laws in states with restrictive bridge formulas using either a dump truck-trailer or a semitrailer arrangement. The invention also provides a rig which can be safely operated and safely dumped with a minimum of time and effort on the part of the operator. Because of its simplicity and because of the arrangement of the invention, the rig can be economically built and the tare weight kept to a minimum thereby increasing the payload. It will be obvious to those skilled in the art that various revisions and modifications can be made to the specific construction shown in the preferred embodiment disclosed herein.

It is my invention, however, that all such revisions and modifications as are obvious to those skilled in the art will be included within the scope of the following claims.

I claim:

1. A truck-trailer combination vehicle for hauling and dumping bulk materials and the like, said vehicle comprising a prime mover having longitudinally spaced-apart front and rear axles, a trailer towed by said prime mover and having an axle, a first dump body located in a position substantially fixed longitudinally relative to the rear axle of said prime mover, a second dump body normally located in a position longitudinally spaced from and to the rear of said first dump body while said vehicle is moving over the road, means providing for relative movement between said dump bodies so that they can be joined, means for locking said dump bodies together when joined, and means for raising the front end of said joined dump bodies as a unit in order to discharge their contents from the rear thereof.

2. The truck-trailer combination vehicle of claim 1 in which said first dump body has a tailgate pivotally mounted at the rear of said body, and said second dump body has both front and rear tailgates, said tailgates for second dump body being pivotally secured to said second dump body so as to swing to the rear as the front of said second dump body is raised.

3. The truck-trailer combination vehicle of claim 1 in which said second dump body is fixed from any substantial longitudinal movement relative to the axle of said trailer.

4. The truck-trailer combination vehicle of claim 3 in which the rear of said second dump body is pivotally mounted on said trailer, and said first dump body is releaseably secured to said vehicle in such a way that when said dump bodies are joined, the rear portion of said first dump body can move in a path defined by the pivotal movement of said second dump body.

5. The truck-trailer combination vehicle of claim 1 in which said prime mover is a dump truck having a chassis, said first dump body being mounted on said chassis, said second dump body being mounted on said trailer, and a telescoping member connects and normally separates said trailer and said dump truck.

6. The truck-trailer combination vehicle of claim 5 in which said first dump body has a tailgate pivotally mounted at the rear of said body, and said second dump body has both front and rear tailgates, said tailgates for second dump body being pivotally secured to said second dump body so as to swing to the rear as the front of said second dump body is raised.

7. The truck-trailer combination vehicle of claim 1 in which said trailer is a semitrailer, said first dump body being mounted near the front of said semitrailer, said second dump body being mounted near the rear of said semitrailer, and said semitrailer is constructed in such a way that said second dump body is normally spaced from and to the rear of said first dump body while providing for said second dump body to be moved into engagement with said first dump body.

8. The truck-trailer combination vehicle of claim 7 in which said semitrailer has a main frame, said dump bodies being mounted on said frame, and said frame is telescoping to provide for joinder of said dump bodies.

9. The truck-trailer combination vehicle of claim 7 in which said first dump body has a tailgate pivotally mounted at the rear of said body, and said second dump body has both front and rear tail gates, said tail gates for said second dump body being pivotally secured to said second dump body so as to swing to the rear as the front of said second dump body is raised.

10. A method of transporting and dumping bulk material and the like in a dump truck and a trailer combination, said method comprising: filling the dump bodies of said dump truck and trailer; towing said trailer at the rear of said dump truck with the trailer spaced from the truck a predetermined distance; moving said trailer and dump truck together at the dumping site; locking the dump body of said trailer to the dump body of said truck; releasing the rear of the dump body from said dump truck; raising the front end of said two dump bodies as a unit while they pivot at the rear of the trailer's dump body, thereby discharging the contents of said dump bodies; lowering said joined dump bodies; unlocking the dump body of said trailer from the dump of said trailer; and separating said dump bodies.